US005770796A

United States Patent [19]

Sakamoto et al.

[11] Patent Number: 5,770,796

[45] Date of Patent: Jun. 23, 1998

[54] FAILURE DIAGNOSIS DEVICE FOR A FUEL PUMP

[75] Inventors: Atsuhiro Sakamoto, Zushi; Toshikazu Oshidari, Yokosuka; Iwane Inokuchi, Yokohama; Shigeru Kamegaya, Tokyo, all of Japan

[73] Assignee: Nissan Motor Co., Ltd., Kanagawa, Japan

[21] Appl. No.: 707,183

[22] Filed: Sep. 3, 1996

[30] Foreign Application Priority Data

Aug. 31, 1995 [JP] Japan .................................... 7-224283

[51] Int. Cl.$^6$ .................................................... G01M 15/00

[52] U.S. Cl. ......................... 73/119 A; 73/113; 73/118.1; 73/168

[58] Field of Search .............................. 73/118.1, 119 A, 73/119 R, 113, 114, 861, 168

[56] References Cited

U.S. PATENT DOCUMENTS

| | | | |
|---|---|---|---|
| 4,094,191 | 6/1978 | Goetsch et al. | 73/118.1 |
| 4,206,634 | 6/1980 | Taylor et al. | 73/119 A |
| 4,333,338 | 6/1982 | Patey et al. | 73/116 A |
| 4,459,846 | 7/1984 | Harrington | 73/114 |
| 4,479,465 | 10/1984 | Flynn | 73/119 A |
| 4,501,140 | 2/1985 | Nakagawa et al. | 73/119 A |
| 4,539,965 | 9/1985 | Soltau | 73/119 A |
| 4,790,277 | 12/1988 | Schechter | 73/119 A |
| 5,179,922 | 1/1993 | Bartholomew | 73/40.5 R |
| 5,499,538 | 3/1996 | Glidewell et al. | 73/119 A |
| 5,616,837 | 4/1997 | Leonard et al. | 73/117.2 |

*Primary Examiner*—George M. Dombroske
*Assistant Examiner*—Eric S. McCall
*Attorney, Agent, or Firm*—McDermott, Will & Emery

[57] ABSTRACT

This device diagnoses whether or not a fuel pump which supplies fuel to an engine has failed. The pump includes a plurality of pressure chambers which in turn discharge fuel according to the rotation of an input shaft which turns together with the engine. The supply capacity of the fuel pump when one of the pressure chambers has failed so as not to be able to discharge fuel is set to a value lower than the maximum value of the fuel supply amount which is required by the engine. A mechanism is provided which decides whether or not the fuel supply requirement of the engine is being satisfied, and failure of the fuel pump is diagnosed based upon the result of this decision. Further, accurate diagnosis can be performed by detecting the power output of the engine for each cylinder individually, and by deciding upon fuel supply insufficiency for each cylinder individually according to variation of the output power for each cylinder individually.

15 Claims, 12 Drawing Sheets

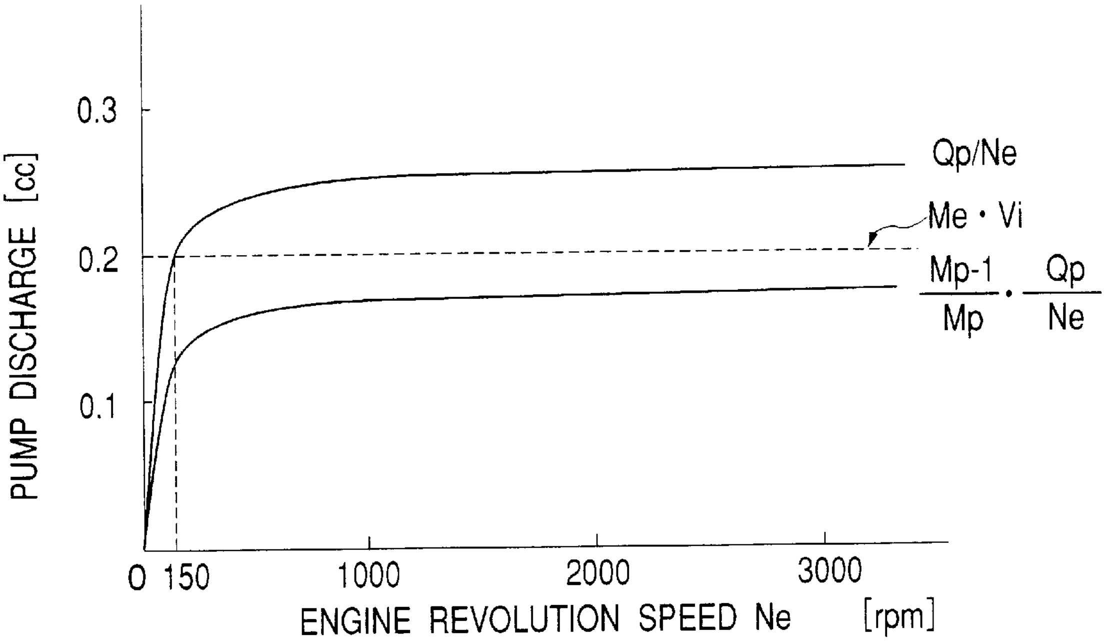
FIG.10
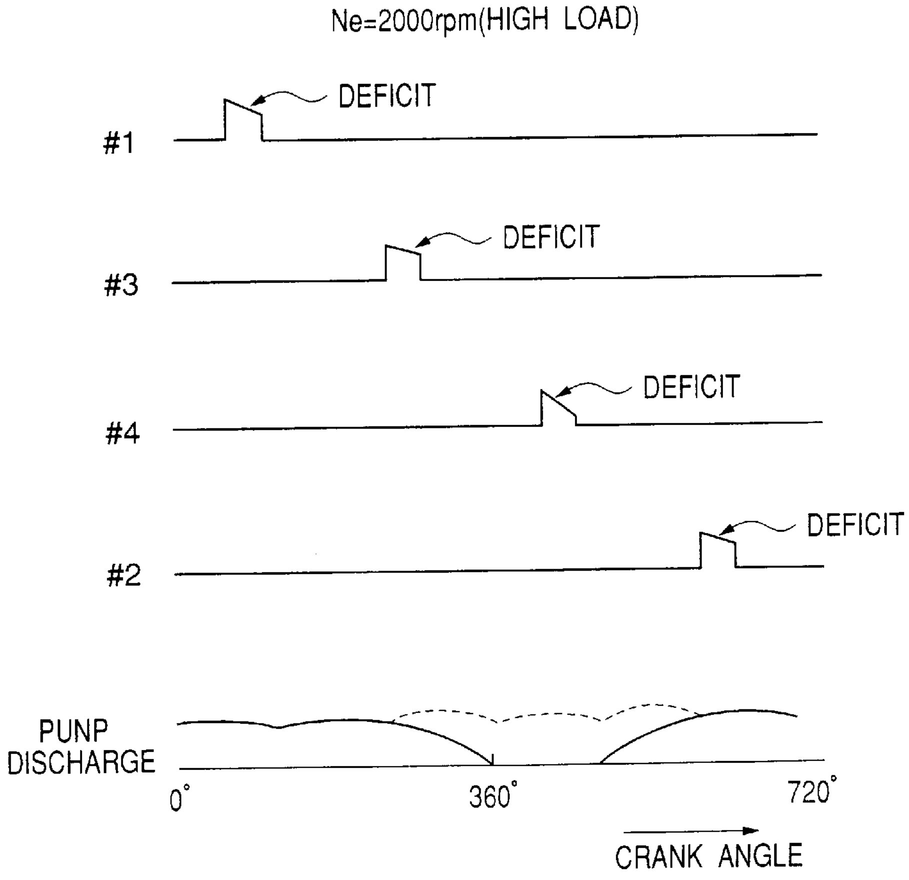
FIG.11A
FIG.11B
FIG.11C
FIG.11D
FIG.11E

Ne=2000rpm(LOW LOAD)

FAILURE DIAGNOSIS DEVICE FOR A FUEL PUMP

FIELD OF THE INVENTION

This invention relates to a failure diagnosis device for a fuel pump which is used for supplying fuel to an engine.

BACKGROUND OF THE INVENTION

With an engine comprising fuel injectors which inject fuel, it is necessary to ensure that the pressure of the injected fuel is high, in order to promote the atomization of the injected fuel. This type of high pressure can be easily obtained, for example, by using a plunger type pump.

However, when a plunger type pump in which a plunger slides within a cylinder is used for gasoline which has low viscosity, the fuel can easily leak out through the gap which is present in order to allow relative sliding motion between the cylinder and the piston, and when such a leak occurs, the pumping efficiency is deteriorated and, as a result, a larger pump is required for the same amount of fuel to pressurize. This adversely affects the fuel performance of the engine.

For this reason there has been disclosed, for example in Tokkai Hei 4-191461 published by the Japanese Patent Office in 1992 and in Jikkai 2-7385 published by the Japanese Patent Office in 1990, a fuel pump in which the leakage of fuel is prevented by each of a plurality of pump chambers which perform fuel pressurization being defined by a bellows and/or a diaphragm which freely expands and contracts.

With such a pump, if for example one of the bellows has become damaged, then the fuel in the pump chamber inside that bellows leaks out into the inside of the pump casing when it is pressurized, and the output capacity of the pump drops. In this case, it becomes impossible to perform injection of the required amount of fuel at the required fuel injection period.

SUMMARY OF THE INVENTION

It is therefore an object of this invention to diagnose failure of a fuel injection pump.

It is a further object of this invention to distinguish between such a failure of the fuel injection pump and a fuel injection problem due to some other cause such as failure of an injector or the like.

In order to achieve the above objects, this invention provides a failure diagnosis device for such a fuel pump that has a plurality of such pressure chambers that, according to the rotation of an input shaft which turns together with an engine, in turn discharge fuel which is supplied to the engine, and a fuel supply capacity set to be lower when one of the pressure chambers has a failure so as not to be able to discharge fuel, than the maximum value of the fuel supply amount which is required by the engine.

The diagnosis device comprises a mechanism for determining whether or not the fuel supply requirement of the engine is satisfied, and a mechanism for diagnosing that the pump has a failure when the requirement is not satisfied.

It is preferable that the determining mechanism comprises a mechanism for detecting engine output power, a mechanism for detecting engine load, a mechanism for comparing engine output power with a threshold value which is predetermined with respect to engine load, and a mechanism for determining that the requirement is not satisfied when engine output power does not reach the threshold value.

It is further preferable that the engine output power detecting mechanism comprises a mechanism for detecting a rotation speed of the engine.

When the engine comprises a mechanism for detecting engine output power, a mechanism for detecting engine load, a mechanism for comparing engine output power with a fixed value which is predetermined with respect to engine load, and a mechanism for increase correcting the fuel amount required when engine output power does not reach the fixed value, it is preferable that the determining mechanism comprises a mechanism for comparing a correction amount provided by the increase correcting mechanism with a threshold value predetermined with respect to engine load, and a mechanism for determining that the requirement is not satisfied when the correction amount has exceeded the threshold value.

It is further preferable that the engine power output detecting mechanism comprises a mechanism for detecting a rotation speed of the engine.

When the engine comprises a mechanism for detecting an oxygen concentration in a exhaust gas of the engine and a mechanism for correcting the fuel supply amount based upon the oxygen concentration, it is preferable that the determining mechanism comprises a mechanism for comparing a correction amount provided by the correcting mechanism with a threshold value predetermined with respect to engine load, and a mechanism for determining that the requirement is not satisfied when the correction amount has exceeded the threshold value.

When the engine comprises a plurality of cylinders and a plurality of injectors which inject fuel from the fuel pump into each cylinder separately, it is referable that the determining mechanism comprises a mechanism for determining whether or not the requirement is satisfied for each cylinder separately and the diagnosing mechanism comprises a mechanism for diagnosing failure of the fuel pump when the requirement for any cylinder is not satisfied.

In any case of the above it is preferable that the device further comprises a mechanism for issuing a warning when the diagnosis mechanism has diagnosed a failure of the fuel pump.

The invention also provides a failure diagnosis device for such a fuel pump that has a plurality of such pressure chambers that according to the rotation of an input shaft which turns together with a four stroke cycle multi-cylinder engine, in turn discharges fuel which is supplied to cylinders of the engine. The device comprises a mechanism for determining whether or not a fuel supply requirement of each of the engine cylinders is satisfied, and a mechanism for diagnosing that the pump has a failure when the requirement of any cylinder is not satisfied.

It is preferable that the determining mechanism comprises a mechanism for detecting engine output power of each cylinder, a mechanism for detecting engine load, a mechanism for comparing engine output power of each cylinder with a threshold value which is predetermined with respect to engine load, and a mechanism for determining that the requirement is not satisfied when engine output power does not reach the threshold value.

It is further preferable that the engine output power detecting mechanism comprises a mechanism for detecting a rotation speed of the engine in a angular range corresponding to a firing stroke of each cylinder.

In any case of the above it is preferable that the device further comprises a mechanism for issuing a warning when the diagnosis mechanism has diagnosed a failure of the fuel pump.

It is also preferable that the device further comprises a mechanism for transmitting a rotation of the engine to the input shaft at a speed change ratio specified by the following equations:

$$Np = n \cdot \frac{Me}{Mp} \cdot Ne \cdot 0.5 \text{ and}$$

$$Np \neq m \cdot Ne \cdot 0.5$$

where, Np is the rotation speed of the input shaft, Ne is the engine rotation speed, Me is the number of cylinders of the engine, Mp is the number of chambers of the fuel pump, and m and n are any positive integers.

The details as well as other features and advantages of this invention are set forth in the remainder of the specification and are shown in the accompanying drawings.

BRIEF DESCRIPTION OF THE DRAWINGS

FIG. 10 is a graph showing a relationship between an engine rotation speed and a discharge amount of the fuel injection pump.

FIGS. 11A through 11E are timing charts showing a pattern of fuel injection to the engine during high load operation when the fuel injection pump has a failure.

DESCRIPTION OF THE PREFERRED EMBODIMENTS

Figure 1:
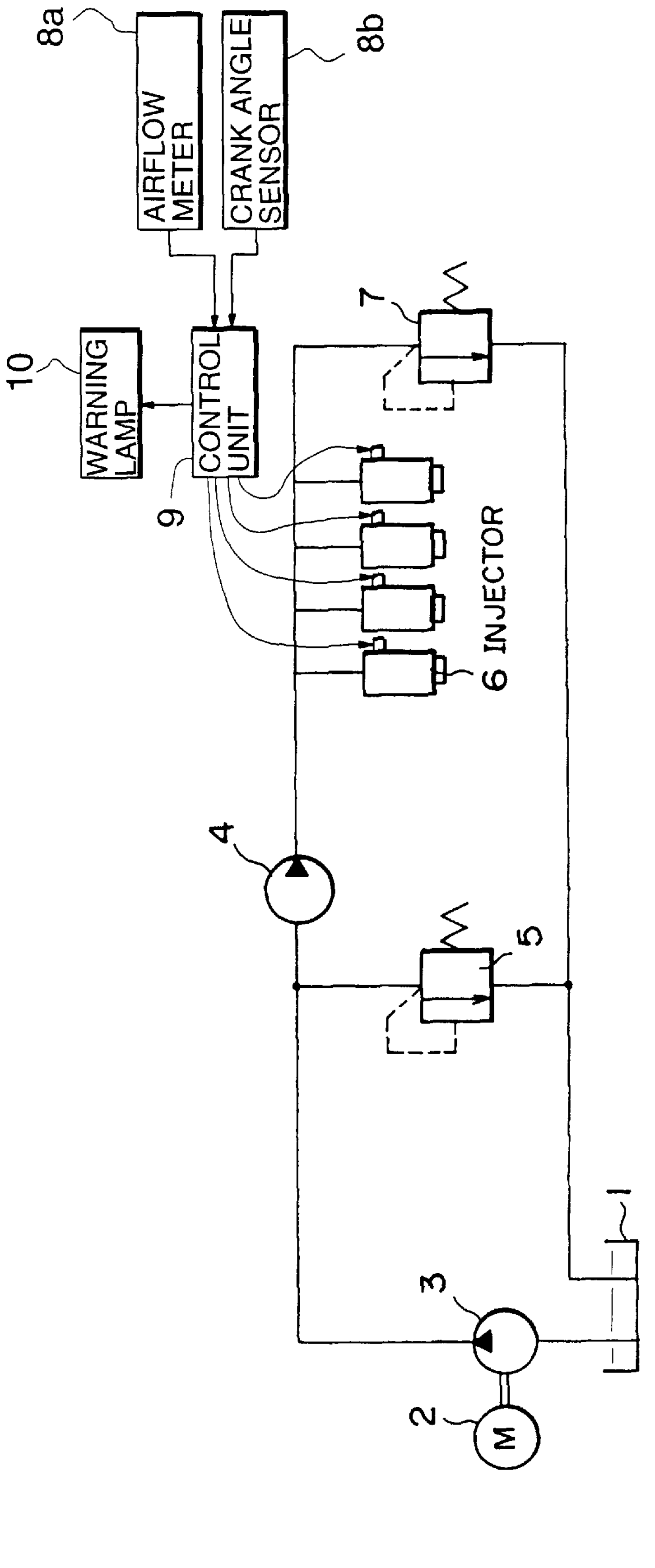
FIG. 1 is a schematic diagram of a failure diagnosis device for a fuel injection pump according to a first preferred embodiment of this invention.

Referring to FIG. 1 of the drawings, each cylinder of a four cylinder four stroke cycle internal combustion engine for an automobile is provided with a fuel injector 6, and fuel from a fuel tank 1 is fed by a feed pump 3 to a fuel injection pump 4 which pressurizes it and supplies it to these fuel injectors 6.

The feed pump 3 is driven by an electric motor 2, and sucks in fuel from the fuel tank 1 and supplies it at a relatively low feed pressure to the fuel injection pump 4. This pressure is maintained constant by a low pressure regulator 5.

The fuel injection pump 4 sucks in the fuel supplied from the feed pump 3, pressurizes it to a relatively high pressure, and discharges it to the fuel injectors 6. This pressure is maintained constant by a high pressure regulator 7.

In passages from the regulator 7 to the fuel injectors 6, there are provided accumulators which are not shown in the figures for smoothing fluctuations in pressure which are caused by the thrumming of the fuel injection pump 4 and by the injection of the fuel. If the capacity of these accumulators is increased, the time period which is required when starting the engine for the fuel pressure to build up until it becomes high enough for injecting the fuel becomes longer, and accordingly the capacity of the accumulators is typically set to about 0.1 cc, which corresponds to one or two fuel injection episodes.

The construction of the fuel injection pump 4 is shown in FIGS. 2 through 8.

This fuel injection pump 4 is a bellows pump. In the fuel injection pump 4, the rotation of a power input shaft 16 expands and contracts bellows 26 via a plate 39, and thereby fuel is sucked in to pressure chambers 29 within the bellows 26 from an intake port 45, is pressurized, and is expelled through a discharge port 46.

Figure 2:
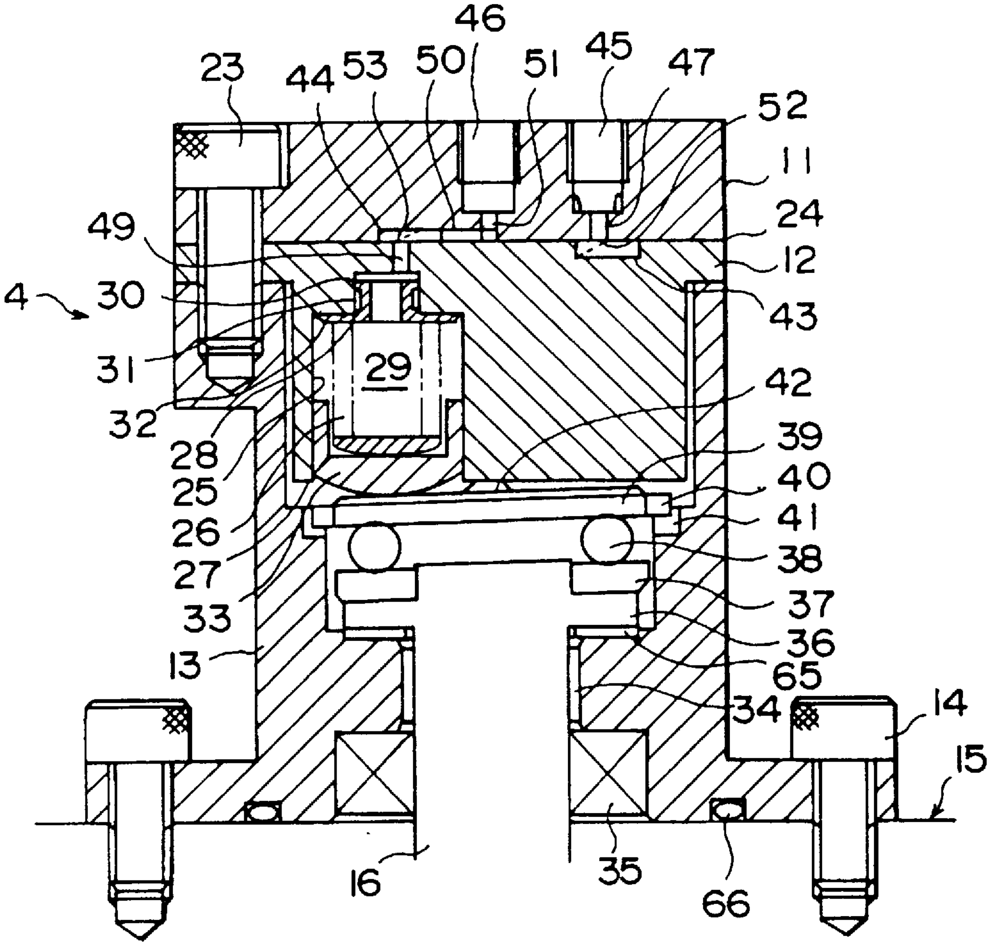
FIG. 2 is a vertical sectional view of the fuel injection pump.
Figure 8:
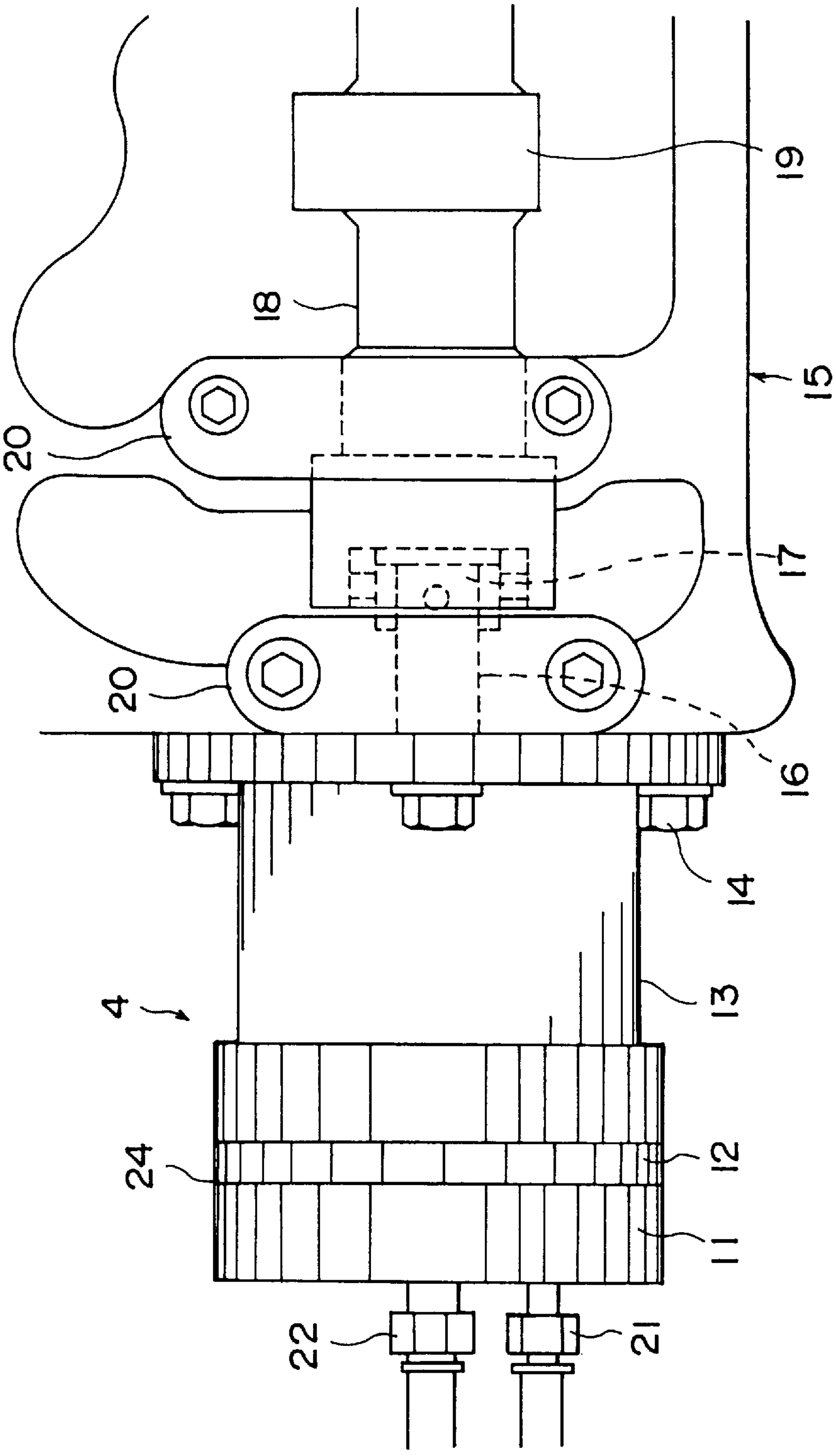
FIG. 8 is a side view of the fuel injection pump as fitted to a cylinder head of an engine.

As shown in FIG. 2, the fuel injection pump 4 comprises a pump head 11, a cylinder block 12, and a casing 13, and as shown in FIG. 8 this casing 13 is fixed by bolts 14 to a cylinder head 15 of the engine. An O-ring 66 is sandwiched between the mating faces of the casing 13 and the cylinder head 15.

The power input shaft 16 of the fuel injection pump 4 is lined to an intake valve side cam shaft 18 via a coupling 17 which can expand and contract in the axial direction. This cam shaft 18 is supported by a bracket 20 so as to rotate in the cylinder head 15, and is coupled to a crankshaft (not shown in the figures) of the engine so as to execute one rotation for every two rotations thereof, and thereby opens and closes an intake valve (also not shown) of the engine via a cam 19, as well as rotating the pump power input shaft 16.

Couplings 21 and 22 are attached to the intake port 45 and to the discharge port 46 in the pump head 11 of the fuel injection pump 4.

As shown in FIG. 2, the pump head 11, the cylinder block 12, and the casing 13 are coupled together by bolts 23.

Figure 7:
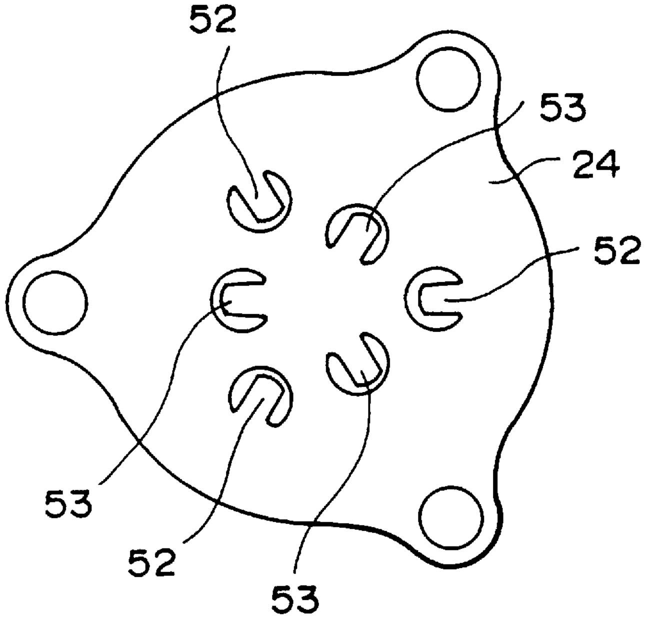
FIG. 7 is a plan view of a reed valve plate used in the fuel injection pump.

A reed valve plate 24, in wihch as shown in FIG. 7 three intake reed valves 52 and three discharge reed valves 53 are formed, is sandwiched between the pump head 11 and the cylinder block 12.

Three cylinders 25 are formed in the cylinder block 12 as arranged around its central axis. Each of these cylinders 25 opens to the end face of the cylinder block 12 which faces the casing 13. Within each of the cylinders 25 there is received a bellows 26 which is generally formed as a circular cylinder.

A part spherical end plate 27 is fixed by welding to an end portion of the bellows 26 which corresponds to the lower end as seen in FIG. 2. This end portion is inserted into the inside of a cap shaped piston 33 which is formed as a circular cylinder, and contacts the bottom surface portion of this piston 33.

A flange 28 is welded to the other end portion of the bellows 26, i.e. to its portion which corresponds to the upper end thereof as seen in FIG. 2. A pressure chamber 29 is defined between the bellows 26, the end plate 27, and the flange 28.

The flange 28 comprises a boss 30. This boss 30 is held in a recess which is formed at a position in the cylinder 25 which corresponds to the upper end thereof as seen in FIG. 2. An O-ring 31 is fitted on the outer periphery of the boss 30 for preventing leakage of fuel from the pressure chamber 29.

The outer diameter of the boss 30 is made smaller than the effective diameter of the bellows 26. Although the pressure in the pressure chamber 29 acts upon the flange 28 from both above and below as seen in FIG. 2, since the outer diameter of the boss 30 is made smaller than the effective diameter of the bellows 26, therefore the pressure receiving area on the underside of the flange 28 is the greater. Accordingly, the pressure in the pressure chamber 29 acts in the upward direction upon the flange 28. The flange 28 is kept at the upper end of the cylinder 25 by this force and by the inherent elastic expansion force of the bellows 26. Moreover, since the feed pump 3 is always kept operating when the engine is rotating, a pressure equal to or greater than a predetermined pressure is always present within the pressure chamber 29.

The outer diameter of the flange 28 is set to be greater than the outer diameter of the bellows 26, and as a result a portion 32 of the flange 28 projects to the outside of the bellows 26.

The casing 13 supports the power input shaft 16 by a metallic bush 34 at its center. A brim 36 is formed at the end of the power input shaft 16. The lower surface in the figure of the brim 36 is planar and extends at right angles to the central axis of the power input shaft 16, and bears against a thrust bearing 65 so as to prevent axial movement of the power input shaft 16 in the downwards direction while leaving it free to rotate. However, the upper surface in the figure of the brim 36 is formed with upward and downward sloping faces, and thus the thickness of the brim 36 is different at different circumferential positions around it.

A thrust bearing which comprises a plate 37, balls 38, and a plate 39 is supported upon this upper sloping surface. The plate 37 is formed as an annular circular plate, and is fixed to the brim 36 so as to rotate as one with the power input shaft 16. The plate 39 is formed as a circular disk plate, and a part spherical projection 42 which is formed at its center is contacted against the cylinder block 12. Further, a part spherical lower end surface of each of the pistons 33 contacts this plate 39. The balls 38 are held between the plate 37 and the plate 39.

Projections 40 are formed at two places around the outer circumference of the plate 39 and extend in the radial direction. These projections 40 are engaged with grooves 41 which are formed in the casing 13, and thereby the plate 39 is prevented from rotating. Accordingly, when the plate 37 which is sloping is rotated, the balls 38 roll on the plate 37, while the plate 39 is not rotated, and the outer peripheral portion of the plate 39 is displaced to and fro generally in the axial direction in a nutating gyration.

Figure 5:
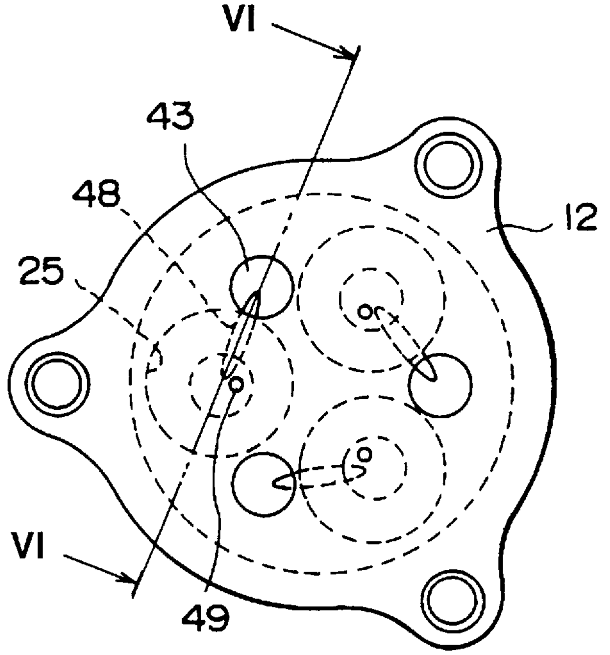
FIG. 5 is a plan view of a cylinder block of the fuel injection pump.
Figure 6:
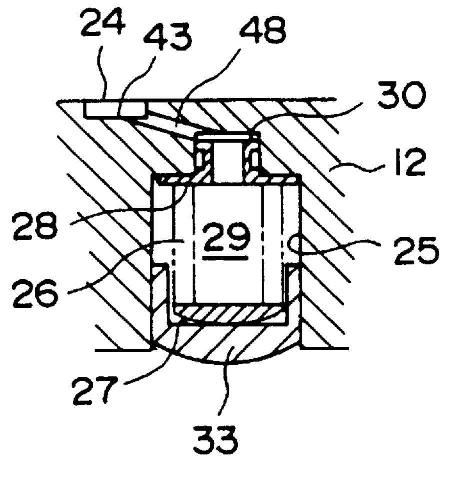
FIG. 6 is a sectional view of a portion of the cylinder block, taken in a sectional plane shown by the lines VI—VI in FIG. 5.

Recesses 43 for the operation of the intake reed valves 52 are formed at three positions in the face of the cylinder block 12 which contacts the pump head 11, and as shown in FIG. 5 these are positioned between the three cylinders 25. Each of these recesses 43, as shown in FIG. 6, is communicated with its corresponding pressure chamber 29 via a fuel conduit 48 which is formed in the cylinder block 12 and via a space on the inside of the boss 30 of the corresponding flange 28.

Figure 3:
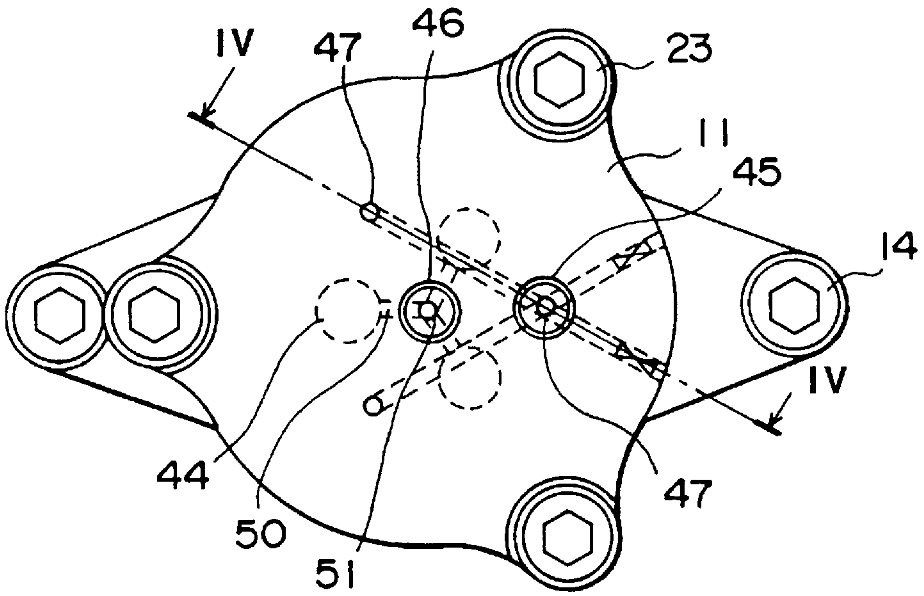
FIG. 3 is a plan view of the fuel injection pump.
Figure 4:
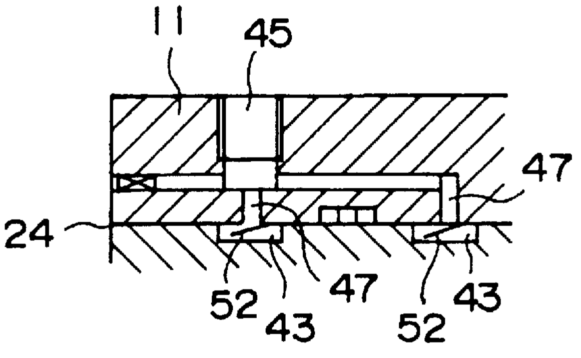
FIG. 4 is a sectional view of a portion of the fuel injection pump, taken in a sectional plane shown by the lines IV—IV in FIG. 3.

On the other hand, a fuel conduits 47 which connect the intake port 45 with the three concave portions 43 is formed in the pump head 11 as shown in FIGS. 3 and 4. This fuel conduits 47 open to positions facing the three recesses 43 in the cylinder block 12. Each of the intake reed valves 52 is opened when the pressure in the corresponding pressure chamber 29 is lower than that in the intake port 45, while it is closed when it is higher.

Further, recesses 44 for the operation of the discharge reed valves 53 are formed at three positions in the face of the pump head 11 which contacts the cylinder block 12. Each of these recesses 44, as shown in FIG. 2, is communicated with the discharge port 46 via a corresponding groove 50 which is formed upon the same contacting face and via a fuel conduit 51 which is formed in the pump head 11.

On the other hand three fuel conduits 49, each of which connects with one of the pressure chambers 29 via the space inside the corresponding boss 30, are formed in the cylinder block 12, as shown in FIG. 2. These fuel conduits 49 open to positions facing the three recesses 44 in the pump head 11. Each of the discharge reed valves 53 is opened when the pressure in the corresponding pressure chamber 29 is higher than that in the discharge port 46, while it is closed when it is lower.

Each of the intake reed valves 52 and the discharge reed valves 53 is formed by providing a horseshoe shaped cutout in the reed plate 24. As shown in FIG. 7, the intake reed valves 52 and the discharge reed valves 53 are arranged alternately, and undue increase in the outer diameter of the fuel injection pump 4 is thereby restrained.

The inside of the casing 13 is filled with lubricating oil, and the sliding resistance and the friction between the various mutually sliding parts are thereby reduced. The casing 13 is further provided with an oil seal 35 which contacts the outer peripheral surface of the power input shaft 16.

The fuel injection pump 4 of the above described construction pressurizes fuel by the expansion and contraction of the three bellows 26 which is caused by the rotation of the power input shaft 16, and supplies this pressurized fuel to the fuel injectors 6. The power input shaft 16 of the fuel injection pump 4 rotates in synchronous with the intake side cam shaft 18.

Since this engine is a four stroke cycle engine, each injector performs one episode of fuel injection each time the engine crankshaft rotates through two complete revolutions, and during this time period the cam shaft 18 and the fuel injection pump 4 rotate through one complete revolution.

Further, the capacity of the fuel injection pump 4 is set in advance so that it no longer can provide the maximum fuel injection amount when one of the three pressure chambers 29 becomes unable to provide fuel discharge, for example due to its bellows 26 becoming damaged, although the fuel injection pump 4 can satisfactorily provide this maximum fuel injection amount when it is operating without any breakdown. Here, the term "maximum fuel injection amount" means an amount of injected fuel which corresponds to the maximum amount of intake air.

In concrete terms, the capacity of the fuel injection pump 4 is determined as follows:

$$Qi = Vi \cdot Me \cdot Ne \cdot 0.5$$

$$Qp = Vpi \cdot Ne \cdot 0.5 - Q_1$$

where:

Ne is the engine rotation speed (rpm);

Qi is the maximum total fuel injection amount of all the injectors (cc/min), at the engine rotational speed Ne;

Vi is the maximum amount of fuel that can be injected by one injector in one injection episode (=about 0.05 cc);

Me is the number of cylinders of the engine (=4);

Qp is the discharge amount of the fuel injection pump (cc/min);

Vpi is the discharge amount of the fuel injection pump for one revolution thereof (cc); and:

$Q_1$ is the amount of internal leakage of the fuel injection pump (=5 cc/min), meaning the amount of back seepage past the reed plate 24 when no leakage from the bellows 26 is taking place.

In order to provide the maximum fuel injection amount for the engine, the discharge amount Qp of the fuel injection pump 4 must be greater than the maximum fuel injection amount Qi. When the above two equations are compared together it will be understood that the lower the engine rotation speed Ne becomes, the larger must Vpi be made in order to satisfy Qp>Qi. In this connection, if it is supposed that the minimum engine rotation speed Nemin at which injection of fuel is to be performed is 150 rpm, then it is necessary for Vpi to be larger than 0.27 cc in order to satisfy Qp>Qi at this minimum rotation speed. If this condition is satisfied, then Qp will always be greater than Qi at engine rotation speeds higher than this.

In other words, when Vpi is less than 0.27 cc, Qp becomes smaller than Qi in a certain range near the minimum rotation speed Nemin.

Figure 9A:
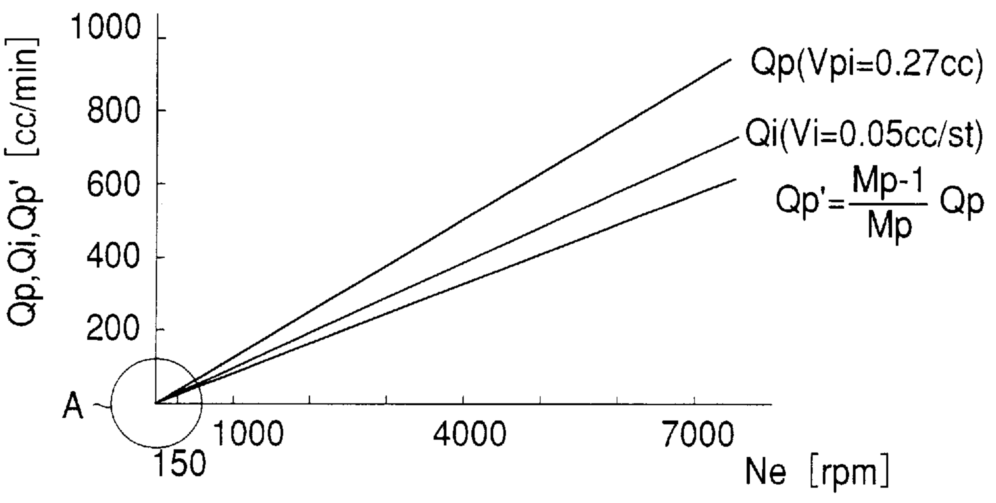
FIG. 9A is a graph showing a relationship between a fuel supply amount of the fuel injection pump and a fuel injection amount of the engine and FIG. 9B is an enlarged view of a portion of FIG. 9A which is surrounded by a circle.
Figure 9B:
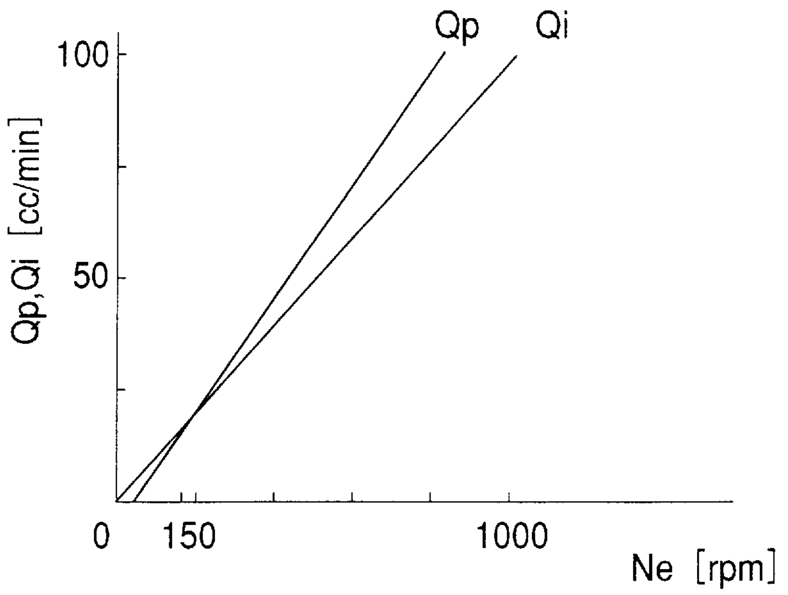
Figure 12A:
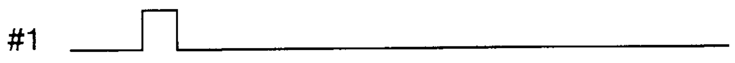
FIGS. 12A through 12E are timing charts showing a pattern of fuel injection to the engine during low load operation when the fuel injection pump has a failure.
Figure 12B:
Figure 12C:
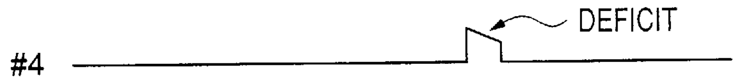
Figure 12D:
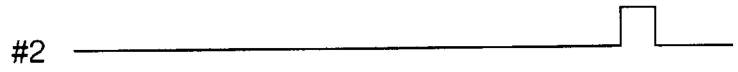
Figure 12E:
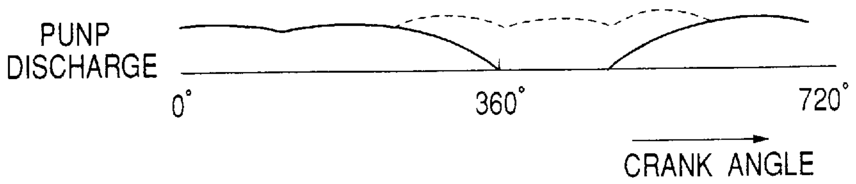

FIGS. 9A and 9B show the relationship between the engine rotation speed Ne, the discharge amount Qp of the fuel injection pump 4, and the maximum fuel injection amount Qi for the engine when Vpi is set to 0.27 cc. Here, FIG. 9B shows the portion of FIG. 9A surrounded by a circle in a magnified view. As shown in FIG. 9B, the pump discharge amount Qp becomes zero before the engine rotation speed Ne arrives at zero, due to the existence of the internal leakage amount $Q_1$.

When one of the three pressure chambers 29 of the fuel injection pump 4 has become unable to provide fuel discharge, for example due to its bellows 26 becoming damaged, then the discharge amount Qp' of the fuel injection pump is given by the following equation, if the number of pressure chambers of the pump is Mp:

$$Qp' = \frac{(Mp-1)}{Mp} \cdot Qp$$

In this first preferred embodiment Mp=3, and when one of the pressure chambers 29 has become unable to provide fuel discharge the pump discharge amount Qp' becomes less than Qi over the entire engine rotation speed region, as shown in FIG. 9B.

FIG. 10 shows the pump discharge amount $$\frac{Qp}{Ne}$$

for one revolution of the engine and the pump discharge amount $$\frac{Mp-1}{Mp} \cdot \frac{Qp}{Ne}$$

when one of the pressure chambers 29 has become unable to provide duel discharge. The dashed line in the figure shows the maximum fuel injection amount Me·Ve. As is shown in this figure, when all of the three pressure chamber 29 of the fuel injection pump 4 are providing pressurized fuel in the normal manner, the maximum fuel injection amount is exceeded in all engine rotation speed regions except for the extremely low rotation speed region, i.e., Ne<Nemin. However, when one of the pressure chambers 29 has become unable to provide fuel discharge, then the maximum fuel injection amount cannot be attained in any engine rotation speed region. The discharge capacity of the fuel injection pump 4 is determined so as to obtain this type of characteristic.

Further, it is desirable for the number of pressure chambers 29 of the fuel injection pump 4 to be odd. For example, with a pump which has three pressure chambers 29 like the pump of this first preferred embodiment, the pump pulsation is lower than that of a pump which has a neighboring even number of pressure chambers, i.e. which has two or four pressure chambers, and this is because its noise and vibration are less.

Fuel which has been pressurized by and discharged from this fuel injection pump 4 is injected into each of the cylinders of the engine by the fuel injector 6 associated therewith.

The fuel injection time period for each of the fuel injectors 6 is controlled electronically according to a pulse signal which is output by a control unit 9. This control unit 9 may for example comprise a microcomputer.

Signals from an air flow meter 8*a* which detects the intake air volume of the engine and a crank angle sensor 8*b* which detects the rotational position of the crankshaft of the engine are input to the control unit 9. This crank angle sensor 8*b* outputs a reference signal Ref at a specific rotational position of the crankshaft and a unit angle signal each time the crankshaft rotates through a predetermined small rotational angle. The control unit 9 determines a basic fuel injection amount for the fuel injectors 6 based upon the volume of intake air as detected by the air flow meter 8*a*.

Further, in order to detect the output power of each cylinder of the engine, the control unit 9 calculates the rotation speed of the engine crankshaft during the first stroke of each of the cylinders from the unit angle signals which are output from the crank angle sensor 8*b* in the crankshaft rotation angle range corresponding to the first stroke of each cylinder, and considers this rotation speed as an indication of the output power of each cylinder. Now, this angle range corresponding to the first stroke of each cylinder is previously known, and is stored in the control unit 9 as data determined in advance. The control unit 9 calculates the rotation speed of the crankshaft by differentiating the unit angle signals in this angle range.

In order to detect this power output, it would also of course be possible to provide a pressure sensor to each cylinder for detecting the pressure therein, and to use the pressure in each cylinder during its firing stroke as an indication of its output power.

The control unit 9 corrects the fuel injection amounts based upon the rotation speeds for each cylinder individually which have been determined as described above. A map which determines the rotation speed in relation to engine load is stored in advance in the control unit 9. Here, the engine load is represented by the amount of intake air as detected by the air flow meter 8*a*. The control unit 9 compares the angular speed for each cylinder and this specified value with one another, and corrects the fuel injection amount by increasing it when the angular speed is smaller than this specified value.

The control unit 9 determines the presence or absence of a failure of the fuel injection pump 4 from this increase correction amount. And if it has determined that failure has occurred, a warning lamp 10 is illuminated so as to inform the driver of the vehicle that an abnormal operational condition has arisen.

FIGS. 11A through 11E show the pattern of fuel injection during high engine load operation, when one of the three pressure chambers 29 of the fuel injection pump 4 has become unable to provide fuel discharge. Here, since the pump discharge amount Qp is insufficient in relation to the maximum fuel injection amount Qi, the amount of fuel injected into all of the cylinders #1 through #4 of the engine is sufficient. In particular, the amount of fuel injected to the cylinder #4 the firing stroke of which corresponds to the discharge timing of that one of the pressure chambers 29 which has become unable to discharge fuel is very much insufficient.

FIGS. 12A through 12E show, in the same manner, the pattern of fuel injection during low engine load operation, when one of the three pressure chambers 29 of the fuel injection pump 4 has become unable to provide fuel discharge. In this case, although there is a surplus in the pump discharge amount Qp with respect to the maximum fuel injection amount Qi, nevertheless the amount of fuel injected to the cylinder #4 the firing stroke of which corresponds to the discharge timing of that one of the pressure chambers 29 which has become unable to discharge fuel is still insufficient.

The control unit 9 distinguishes these fuel injection patterns which are characteristic of failure of the fuel injection pump 4 from the correction amounts for the fuel injection timing periods, and determines upon the presence or absence of failure of the pump 4 based thereupon.

Figure 13:
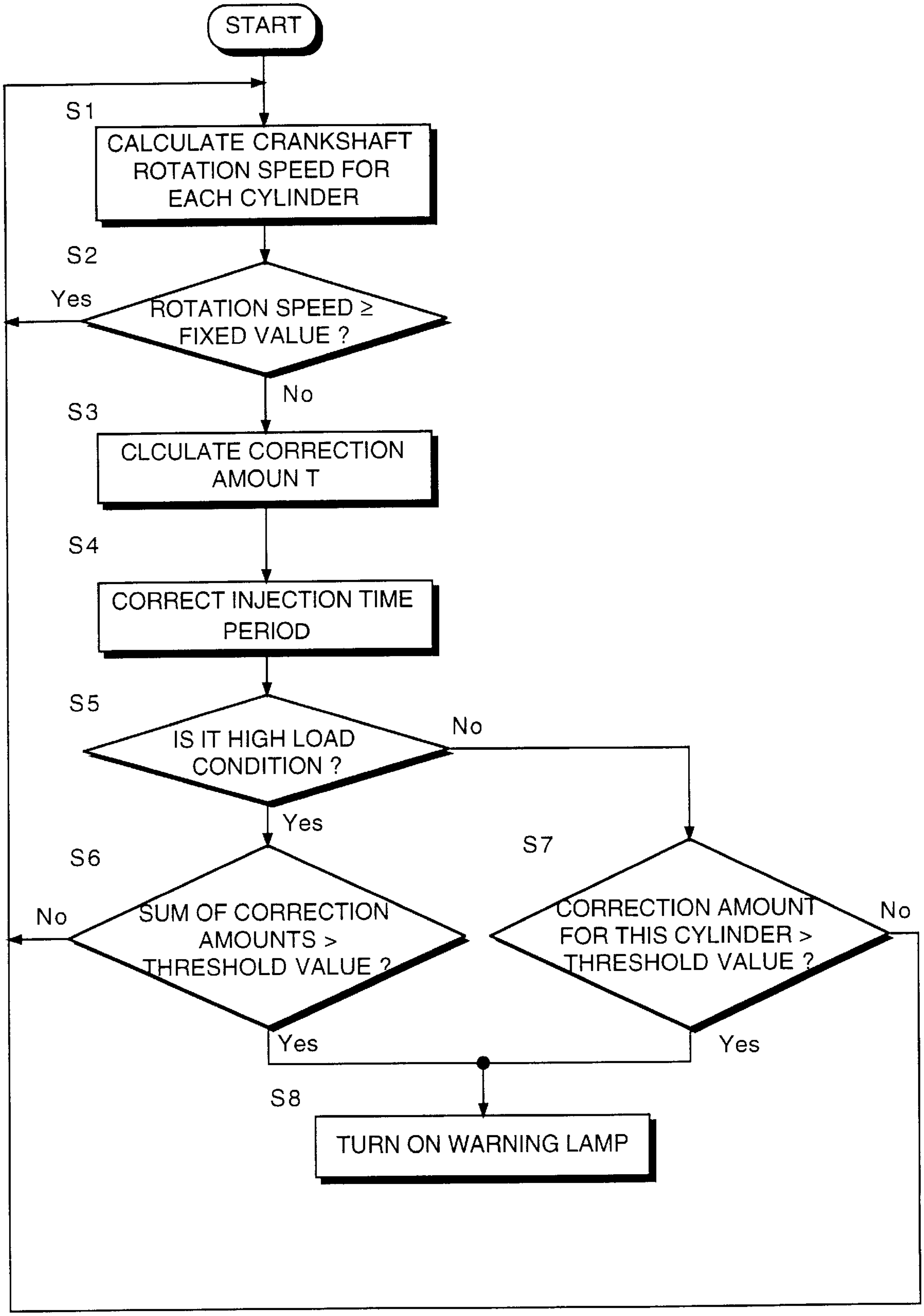
FIG. 13 is a flow chart for explanation of a failure diagnosis process for the fuel injection pump, according to the first preferred embodiment of this invention.
Figures 14A, 14B, 14C, 14D, 14E:
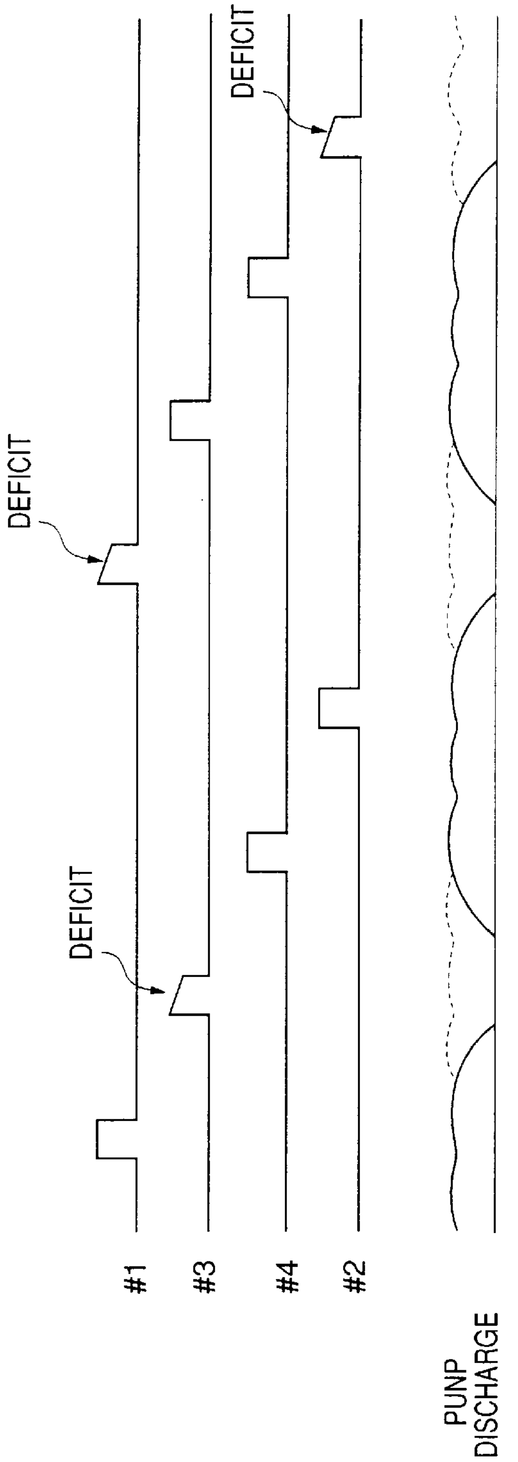
FIGS. 14A through 14E are timing charts showing patterns of fuel injection for explanation of an algorithm for failure diagnosis of the fuel injection pump according to a second preferred embodiment of this invention.
Figure 15:
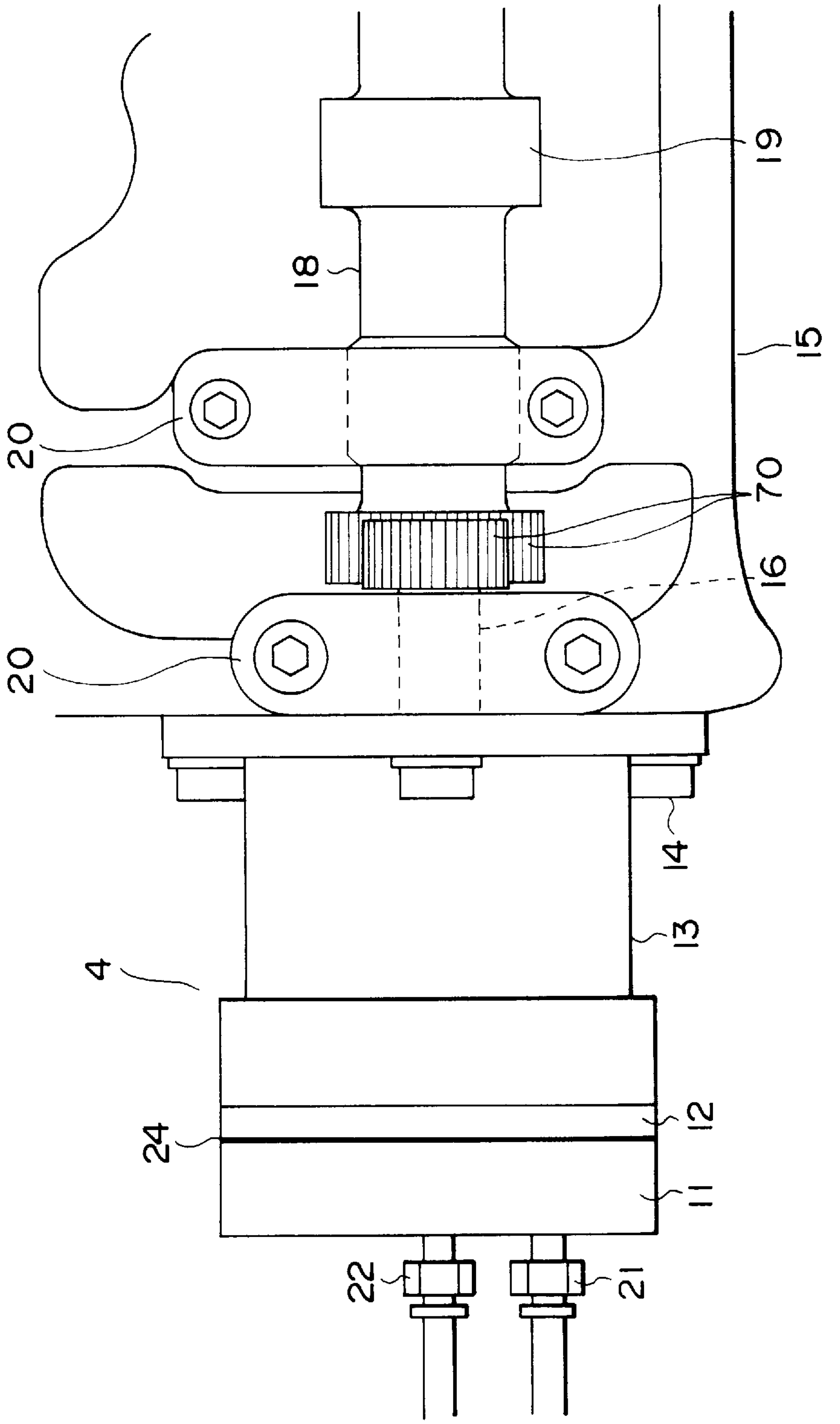
FIG. 15 is similar to FIG. 8, but showing a fuel injection pump according to the second preferred embodiment.

FIG. 13 is a flow chart for explanation of the process of failure detection which is performed by the control unit 9. This route is executed, based upon the reference signal Ref from the crank angle sensor 8*b*, one for each firing stroke of each cylinder of the engine, in other words twice for each rotation of the engine crankshaft, in the case of a four stroke cycle four cylinder engine.

In a first step S1, the crankshaft rotation speed for each cylinder is calculated. This is obtained from the unit angle signal from the crank angle sensor 8*b* as described above.

In a step S2, this rotation speed and a fixed value which is obtained from the map described above are compared with one another. And if the output power is insufficient then in a step Step S3 a correction amount for the fuel injection time period corresponding to the amount of insufficiency is calculated, and then in a step S4 the fuel injection time period is corrected by being increased based upon this correction amount.

In a step S5, the control unit 9 decides whether or not the current engine operating condition is that of high load, based upon the amount of intake air as detected by the air flow meter 8*a*. This decision is made by comparing the intake air flow amount with a predetermined value.

If it has been determined that the engine is operating under the high load condition, then the flow of control proceeds to a step S6, in which the sum of the correction amounts for the last four cylinder strokes is compared with a threshold value. This threshold value is a value determined in advance according to engine load which is the upper limit of the acceptable range for the total of the correction amounts for four episodes of fuel injection. If the sum of the last four correction amounts for four episodes of fuel injection. If the sum of the last four correction amounts is greater than the threshold value, then since the correction amount has exceeded that which is generated for normal engine operating conditions, it is considered that something abnormal has happened with the fuel injection pump 4, and in a step S8 the warning lamp 10 is turned on. This condition corresponds to the fuel injection pattern shown in FIGS. 11A–11E.

On the other hand, if in the step S5 it has been determined that the engine is operating under the low load condition, then the flow of control proceeds to a step S7, in which the correction amount just calculated in the previous step S3 is compared with another threshold value set separately from the one in the step S6. This threshold value is a value determined as before according to engine load which is the upper limit of the acceptable range for the correction amount for one episode of fuel injection. If the last correction amount is greater than the threshold value, then since the correction amount has exceeded that which is generated for normal engine operating conditions, it is considered that something abnormal has happened with the fuel injection pump 4, and as before in the step S8 the warning lamp 10 is turned no. This condition corresponds to the fuel injection pattern shown in FIGS. 12A–12E. In this case it is only one cylinder #4 from among the four cylinders #1–#4 for which the correction value has exceeded the threshold value. Accordingly, the control unit 9 has detected for one cylinder only a fuel injection pattern with which the threshold value has been exceeded, and illuminates the warning lamp 10.

Next, a second preferred embodiment of this invention will be described with reference to FIGS. 14A through 14E and FIG. 15.

In this second preferred embodiment, the rotational force of the cam shaft 18 is transmitted to the power input shaft 16 of the fuel injection pump 4 via a gear 70. The gear ratio of the gear 70, i.e. the ratio of the rotation speeds of the power input shaft 16 and the cam shaft 18, is determined according to the following equation:

$$Np = \frac{4}{3} \cdot Ne \cdot 0.5$$

where Np is the rotation speed of the pump 4.

For a four stroke cycle four cylinder engine, two of the cylinders execute their firing strokes during the time period required for the engine crankshaft* to rotate through two complete revolutions. The camshaft rotates through one complete revolution during the time period required for the engine crankshaft* to rotate through one complete revolution, and opens and close the valves for the four cylinders in order. Accordingly, the $$\frac{Np}{Ne \cdot 0.5}$$

(=4:3) in the above equation is the gearing ratio between the power input shaft 16 and the cam shaft 18. Due to this gearing ratio, the interval between successive discharges of fuel by successively actuated pressure chambers 29 of the fuel injection pump 4 and the interval between successive injections of fuel through the fuel injectors 6 are brought to be in agreement.

Accordingly, by setting the capacities of the accumulators which are provided to the fuel injectors 6 to the minimum limit which is required for absorbing pulsation, if one of the pressure chambers 29 has become unable to discharge fuel, the influence thereof upon the fuel injection pattern becomes clear.

In other words, suppose that as shown in FIGS. 14A through 14E the fuel injection amount is insufficient for one of the pump cylinders from among the three successive pump cylinders which perform properly by two of the pump cylinders in succession, the fuel injection amount provided by the next pump cylinder is definitely insufficient, and thus the fuel injection correction amount increases. Accordingly, when the control unit 9 has detected this pattern, it is possible dependably to establish that the fuel injection pump 4 has suffered a failure. Moreover in this case, in contrast to the case with the first preferred embodiment described above, since one out of each three episodes of fuel injection is insufficient, therefore the engine cylinder for which the fuel injection amount is insufficient changes around in turn between the four engine cylinders.

If on the other hand a particular one of the fuel injectors 6 has suffered a failure and has become unable to inject fuel, then the fuel injection correction amount which is increased will be always for the same cylinder. Therefore, according to this second preferred embodiment, it is possible accurately to distinguish poor fuel injection which is due to a failure of the fuel injection pump 4 from poor fuel injection which is due to an inherent cause relating to a particular engine cylinder such as a failure of the fuel injector which corresponds thereto.

With the above described second preferred embodiment, the gear ratio is set so establish one to one timing correspondence between fuel discharge from the pressure chambers 29 and fuel injection by the fuel injectors 6. However, this timing correspondence should not be considered as being limited to one to one. It is also possible to detect from the fuel injection pattern that a specific pressure chamber has become unable to discharge fuel with a gear ratio which establishes an n to one timing correspondence in which fuel discharge from the pump 4 occurs n times during one episode of fuel injection by each injector 6, provided that the gear ratio is such that the irregularity which is generated in the fuel injection pattern of the fuel injectors 6 follows a specific rule. The conditions for this are determined as follows:

$$Np = n \cdot \frac{Me}{Mp} \cdot Ne \cdot 0.5$$

and moreover $$Np \neq m \cdot Ne \cdot 0.5$$

where n and m are any integers equal to or greater than 1.

For example, with n=2, then the above conditions will be satisfied if the gear ratio is 8:3. In this case pump fuel discharge occurs 2 times during one episode of fuel injection by an injector 6, and in the event of one of the pressure chambers 29 of the pump 4 failing the fuel injection amount will be insufficient for ⅔ of all fuel injection episodes; i.e., for every three engine cylinders in sequence into which fuel is injected, for two of these cylinders the amount of injected fuel will be insufficient.

And, with n=3, then the above conditions will be satisfied if the gear ratio is 4. In this case pump fuel discharge occurs 3 times during one episode of fuel injection by an injector 6, and in the event of one of the pressure chambers 29 of the pump 4 failing the fuel injection amount will be insufficient in every fuel injection episode, and accordingly the fuel injection patterns will all be the same. Accordingly, in this case, it is not possible to detect that one of the pressure chambers 29 has become unable to discharge fuel.

Moreover, with n=4, then the above conditions will be satisfied if the gear ratio is 16:3. In this case pump fuel discharge occurs 4 times during one episode of fuel injection by an injector 6, and, in the event of one of the pressure chambers 29 of the pump 4 failing, fuel discharge by the pump will be impossible at least once during all fuel injection episodes. However, for every three engine cylinders in sequence into which fuel is injected, during one of these fuel injection episodes failure of fuel discharge by the pump will occur twice instead of once out of the four normal times, and accordingly, since the amount of fuel insufficiency for this fuel injection episode therefore becomes greater as compared with the other fuel injection episodes, a specific fuel injection pattern is generated with which the failure of the pressure chamber 29 can be recognized.

The embodiment of this invention in which an exclusive property or privilege is claimed are defined as follows:

1. A failure diagnosis device for a fuel pump, said pump having a plurality of pressure chambers that, according to a rotation of an input shaft which turns together with an engine, in turn discharge fuel which is supplied to said engine, wherein a fuel supply capacity of said pump is set to be lower, when one of said pressure chambers has a failure so as not to be able to discharge fuel, than a maximum value of a fuel supply amount which is required by said engine, comprising:

means for determining whether or not a fuel supply requirement of said engine is satisfied, and means for diagnosing that said pump has a failure when said fuel supply requirement is not satisfied.

2. A failure diagnosis device as defined in claim 1, wherein said determining means comprises means for detecting engine output power, means for detecting engine load, means for comparing engine output power with a threshold value which is predetermined with respect to engine load, and means for determining that said fuel supply requirement is not satisfied when engine output power does not reach said threshold value.

3. A failure diagnosis device as defined in claim 2, wherein said engine output power detecting means comprises means for detecting a rotation speed of said engine.

4. A failure diagnosis as defined in claim 1, wherein said engine comprises means for detecting engine output power, means for detecting engine load, means for comparing engine output power with a fixed value which is predetermined with respect to engine load, and means for increase correcting the fuel amount required when engine output power does not reach said fixed value, and wherein said determining means comprises means for comparing a correction amount provided by said increase correcting means with a threshold value predetermined with respect to engine load, and means for determining that said fuel supply requirement is not satisfied when said correction amount has exceeded said threshold value.

5. A failure diagnosis device as defined in claim 4, wherein said engine power output detecting means comprises means for detecting a rotation speed of said engine.

6. A failure diagnosis as defined in claim 1, wherein said engine comprises means for detecting an oxygen concentration in an exhaust gas of said engine, and means for correcting the fuel supply amount based upon said oxygen concentration, and wherein said determining means comprises means for comparing a correction amount provided by said correcting means with a threshold value predetermined with respect to engine load, and means for determining that said fuel supply requirement is not satisfied when said correction amount has exceeded said threshold value.

7. A failure diagnosis device according to claim 1, wherein said engine comprises a plurality of cylinders and a plurality of injectors which inject fuel from said fuel pump into each cylinder separately, and wherein said determining means comprises means for determining whether or not said fuel supply requirement is satisfied for each cylinder separately and said diagnosing means comprises means for diagnosing failure of said fuel pump when said fuel supply requirement for any cylinder is not satisfied.

8. A failure diagnosis device according to claim 1, further comprising means for issuing a warning when said diagnosis means has diagnosed a failure of said fuel pump.

9. A failure diagnosis device for a fuel pump, said pump having a plurality of pressure chambers that, according to a rotation of an input shaft which turns together with a four stroke cycle multi-cylinder engine, in turn discharges fuel which is supplied to cylinders of said engine, comprising:

means for determining whether or not a fuel supply requirement of each of said engine cylinders is satisfied, and means for diagnosing that said pump has a failure when said fuel supply requirement of any cylinder is not satisfied.

10. A failure diagnosis device according to claim 9, wherein said determining means comprises means for detecting engine output power of each cylinder, means for detecting engine load, means for comparing engine output power of each cylinder with a threshold value which is predetermined with respect to engine load, and means for determining that said fuel supply requirement is not satisfied when engine output power does not reach said threshold value.

11. A failure diagnosis device according to claim 10, said engine output power detecting means comprises means for detecting a rotation speed of said engine in a angular range corresponding to a firing stroke of each cylinder.

12. A failure diagnosis device according to claim 9, further comprising means for issuing a warning when said diagnosis means has diagnosed a failure of said fuel pump.

13. A failure diagnosis device according to claim 9, further comprising means for transmitting a rotation of said engine to said input shaft at a speed change ratio specified by the following equations:

$$Np = n \cdot \frac{Me}{Mp} \cdot Ne \cdot 0.5 \text{ and}$$

$$Np \neq m \cdot Ne \cdot 0.5$$

where, Np is the rotation speed of said input shaft, Ne is the engine rotation speed, Me is the number of cylinders of said engine, Mp is the number of chambers of said fuel pump, and m and n are any positive integers equal to or greater than 1.

14. A failure diagnosis device according to claim 1, wherein both of said determining means and diagnosing means are permanently combined with said fuel pump.

15. A failure diagnosis device according to claim 9, wherein both of said determining means and diagnosing means are permanently combined with said fuel pump.

* * * * *